United States Patent
Dreyer (10) Patent No.: US 10,956,876 B2
(45) Date of Patent: Mar. 23, 2021

(54) CONNECTED ENTRANCE SYSTEM

(71) Applicant: ASSA ABLOY ENTRANCE SYSTEMS AB, Landskrona (SE)

(72) Inventor: Roger Dreyer, Bjarred (SE)

(73) Assignee: Assa Abloy Entrance Systems AB, Landskrona (SE)

(*) Notice: Subject to any disclaimer, the term of this patent is extended or adjusted under 35 U.S.C. 154(b) by 0 days.

(21) Appl. No.: 16/489,574

(22) PCT Filed: Mar. 6, 2018

(86) PCT No.: PCT/EP2018/055392
§ 371 (c)(1),
(2) Date: Aug. 28, 2019

(87) PCT Pub. No.: WO2018/162436
PCT Pub. Date: Sep. 13, 2018

(65) Prior Publication Data
US 2020/0013021 A1 Jan. 9, 2020

(30) Foreign Application Priority Data
Mar. 7, 2017 (SE) .................................. 1730060-9

(51) Int. Cl.
*G06Q 10/00* (2012.01)
*E05F 15/60* (2015.01)
*G08B 21/00* (2006.01)

(52) U.S. Cl.
CPC ............. *G06Q 10/20* (2013.01); *E05F 15/60* (2015.01); *E05Y 2400/458* (2013.01); *E05Y 2400/50* (2013.01)

(58) Field of Classification Search
CPC .......... G06Q 10/20; E05F 15/60; E05F 15/70; E05Y 2400/458
(Continued)

(56) References Cited

U.S. PATENT DOCUMENTS 6,318,024 B1 * 11/2001 Krsnak .................. E05D 13/12
49/177
6,854,565 B2 * 2/2005 Perala .................. B66B 5/0006
187/247
(Continued)

FOREIGN PATENT DOCUMENTS

DE 4245038 11/2003

OTHER PUBLICATIONS

International Search Report and Written Opinion of the International Searching Authority mailed in PCT/EP2018/055392 dated Jun. 1, 2018.
(Continued)

*Primary Examiner* — Nam V Nguyen
(74) *Attorney, Agent, or Firm* — Wissing Miller LLP (57) ABSTRACT

The disclosure proposes a method performed in an electronic device for minimizing downtime in operation of a door system. The method comprising obtaining a door system identification information, followed by obtaining a status pattern associated with the operation of the door system associating the obtained status pattern with the door system identification information. The method is determining if the obtained status pattern is associated with any of at least one reference status pattern, by comparing the obtained status pattern with the at least one reference status pattern. This is then followed by associating the determined reference status pattern with the door system identification information and generating a door maintenance information.

16 Claims, 6 Drawing Sheets

(58) Field of Classification Search
USPC .......................................................... 340/5.71
See application file for complete search history.

(56) References Cited

U.S. PATENT DOCUMENTS

| | | | | |
|---|---|---|---|---|
| 8,653,982 | B2* | 2/2014 | Yulkowski | E05F 15/70 |
| | | | | 340/686.1 |
| 9,309,089 | B2* | 4/2016 | Annen | B66B 3/00 |
| 9,506,284 | B2* | 11/2016 | Braverman | E05F 15/70 |
| 9,580,276 | B2* | 2/2017 | Toutaoui | B66B 5/0087 |
| 9,586,790 | B2* | 3/2017 | Tyni | B66B 5/0006 |
| 9,982,459 | B2* | 5/2018 | Telljohann | E05B 41/00 |
| 10,047,551 | B2* | 8/2018 | Eickhoff | E05F 15/40 |
| 10,196,236 | B2* | 2/2019 | Sonnenmoser | B66B 5/0025 |
| 2003/0213177 | A1 | 11/2003 | Fitzgibbon | |
| 2006/0176171 | A1 | 8/2006 | Fitzgibbon | |
| 2008/0224642 | A1 | 9/2008 | Rodriguez | |
| 2011/0016971 | A1 | 1/2011 | Yulowski | |
| 2013/0276373 | A1 | 10/2013 | Haab et al. | |
| 2015/0077219 | A1 | 3/2015 | Keller, Jr. | |

OTHER PUBLICATIONS

SE Search Report mailed in SE 1730060-9 dated Nov. 1, 2017.

* cited by examiner

CONNECTED ENTRANCE SYSTEM

This application is a 371 of PCT/EP2018/055392 filed on Mar. 6, 2018, published on Sep. 13, 2018 under publication number WO 2018/162436, which claims priority benefits from Swedish Patent Application No. 1730060-9 filed on Mar. 7, 2017, the disclosure of which is incorporated herein by reference.

TECHNICAL FIELD

The disclosure pertains to the field of maintenance of door systems. The present invention relates to a door system and a method for determining a status pattern of the operation of the door system and triggering a status event at least based on the determined status pattern.

BACKGROUND OF THE INVENTION

A door operator typically comprises a control unit and a drive unit. The control unit controls the drive unit to move a door leaf between a closed and an open position. The control unit controls the trajectory of the door including the speed of the door, the opening angle of the door and time that the door should stay opened.

A door operator obtains input of that the door should be opened from activation sensors in the door operator that identify that a person or a vehicle is approaching the door. The service of the door operator is traditionally based on a prescheduled scheme based on time and/or number of opening cycles of the door leaf. The service scheme based on this will, however, lead to that the door operator in some cases will have service to often and that parts will be replaced based on time/cycles instead of their functionality. The service provider don't have any input of which parts in the door operator that has been exposed to an extensive wear and need to be replaced even if it is not included in the service scheme and this will lead to that the service provider will have to return for a second service after obtaining the needed service parts. Further, service of the door operator is called upon once the door operator stops functioning, i.e. a breakdown has already occurred, and this will lead to downtime of the door until it has been repaired.

SUMMARY

An object of the present disclosure is to provide a method and a device which seek to mitigate, alleviate, or eliminate one or more of the above-identified deficiencies in the art and disadvantages singly or in any combination.

An object of the present disclosure is to provide a door operator that can identify the status of its operation and/or the operation of the door leaf that it is connected to and to call for service based on the actual status of the door operator and/or door leaf.

An object of the present disclosure is to provide a door operator and a method that reduces the downtime of the door system. An object of the present disclosure is to provide an electronic device and a method that reduces the costs for service of the door operator. In this disclosure, a solution to the problem outlined above is proposed.

The disclosure proposes a method performed in an electronic device for minimizing downtime in operation of a door system. The method comprising obtaining a door system identification information, followed by obtaining a status pattern associated with the operation of the door system associating the obtained status pattern with the door system identification information. The method is determining if the obtained status pattern is associated with any of at least one reference status pattern, by comparing the obtained status pattern with the at least one reference status pattern. This is then followed by associating the determined reference status pattern with the door system identification information and generating a door maintenance information. An advantage with the method is that with help from the status pattern, the method can determine the status of a certain door system and also predict e.g. when in time a certain service is needed in order to reduce the downtime of the operation of the door system.

According to some aspects of the disclosure, the method further comprises obtaining a maintenance execution information. Hence, with either a manual input or a system input of information about what maintenance that has been carried out, it becomes easier to determine if a certain maintenance was successful or not with respect to obtained status patterns. This information is valuable for future generation of door maintenance information.

According to some aspects of the disclosure, generating the door maintenance information is based on at least one of a door system identification information; a determined status pattern association; and/or a maintenance execution information. The door system identification information e.g. information about a certain model or type of door, can be used to identify similar door systems and then compare what service or maintenance that has been carried out on these door systems with a positive result and use this data to suggest or recommend a certain service or maintenance to be carried out on the particular door system in question. The determined status pattern association can be used to determine a status and indicate what the next action is. Maintenance execution information, i.e. information on what service or maintenance that has been carried out on other door systems (or the specific door system in question) can be used to extract information on e.g. what certain component that should be replaced etc. With this information prediction of service can be more accurate and addressed to the specific door system.

According to some aspects of the disclosure the door system comprising at least a door leaf and/or a door operator. The door system can hence operate the closing or opening of the door leaf. The door system may comprise other elements or components.

According to some aspects of the disclosure, the obtained status pattern comprising sensor data associated with the operation of the door system. Hence, the operation of the door system can be monitored by at least one sensor device and the sensor data generated from the at least one sensor device can be described e.g. by a mathematical function and be compared with other sensor data generated by other door systems.

According to some aspects of the disclosure the reference status pattern is at least one of a first reference status pattern, a second reference status pattern or a third reference status pattern. Hence, plural reference status patterns can exist and further reference status patterns can be added. According to some aspects of the disclosure the reference status pattern is associated with at least one of a service event information; a no service event information; or a breakdown event information. A service event information can indicate a certain service that is applicable for a certain status pattern. The no service event information can give a feedback that the door is operating as normal and no additional service is needed for a certain status pattern. A breakdown information can indicate that a service is needed urgently for a certain status pattern. An advantage with the associations, is that a more accurate information can be given when generating the door maintenance information.

According to some aspects of the disclosure the door maintenance information comprising at least one of: a component replacement information; a service maintenance information; data software update information; system adjustment information; a parameter setting information; and/or a service time information. With detailed information, the planning and execution of the service or maintenance becomes cheaper and faster.

According to some aspects of the disclosure, the method then further comprising obtaining a geographic location for at least one door system based on the door system identification information and detecting door maintenance information for at least one door system within the geographic location. The method then further comprising determining a time when at least one door system within the certain geographic location needs maintenance based on the door maintenance information for the at least one door system. Hence, with detailed information about position information and time information, the planning and execution of the service or maintenance becomes more cost effective and faster and utilization of service staff hours can be optimized based on geographic position information.

According to some aspects of the disclosure, the method further comprising determining if plural door systems within the certain geographic location needs maintenance within a certain time period based on door maintenance information for the plural door systems. This means that plural door systems can get service or maintenance at the same time within the same graphical location and thereby making maintenance and service of the door system efficient and cost effective. The planning and execution of the service or maintenance becomes more cost effective and faster and utilization of service staff hours can be optimized based on geographic position information.

According to some aspects of the disclosure, the method further comprising generating a reference status pattern based on at least one previous obtained status pattern. An advantage with this is that a new reference status pattern can be generated. A new reference status pattern can relate to a status pattern that has become known after understanding that the particular status pattern has characteristics that is associated with a certain service or maintenance action or if the door system is in normal operation. Hence, a new reference status pattern can be generated and associated with a certain status information in order to generate a more accurate door maintenance information.

According to some aspects of the disclosure, the method further comprising generating a reference status pattern based on at least one previous obtained status pattern and a maintenance execution information. This means that with knowledge about a certain service or maintenance that has been carried out on a certain door system that before the service or maintenance had a certain obtained status pattern, the generation of a new reference status pattern can take the obtained status pattern and associate that status pattern with a certain type of status.

According to some aspects of the disclosure, the method further comprising obtaining a maintenance execution information and obtaining an updated status pattern associated with the operation of the door system. Maintenance execution information describing what service or maintenance that has been carried out can be obtained either by manual input by service staff or by system input, e.g. a new component that is connected to a system bus or e.g. a software upgrade to a new version. Hence, when maintenance execution information is obtained an updated status pattern can be obtained in order to e.g. verify or control if the service or maintenance that has been carried out have had an impact of the operation of the door system or not.

According to some aspects of the disclosure, the method further comprising obtaining maintenance execution information comprising information regarding executed maintenance associated with the door system identification information and obtaining an updated status pattern associated with the operation of the door system. The method then further comprising determining if the updated status pattern is associated with the reference status pattern that is a no service event followed by associating the maintenance execution information message with the obtained status pattern if the updated status pattern is associated with a reference status pattern that is a no service event. Hence, after obtaining maintenance execution information and an updated status pattern associated with the operation of the door system the method then verifies or controls if the service or maintenance that has been carried out have had a positive impact on the operation of the door system. This is done by determining if the updated status pattern is associated with a reference status pattern that is associated with a no service event meaning that no service is needed. This information is not only usable to understand that the door system is back to a normal operation mode after the service, but also for the system to learn by associating a certain maintenance execution information with a certain status pattern in order to generate door maintenance information that contains a more detailed information about what service or maintenance that is needed when a certain status pattern is obtained in the future.

According to some aspects of the disclosure the door operator, for moving at least one door leaf between a closed and an open position, comprising a drive unit, a control unit and an supervise unit.

According to some aspects of the disclosure the supervise unit comprise one or more sensors configured to provide sensor data associated with the operation of the door operator and/or the at least one door leaf.

The disclosure further proposes an electronic device configured for minimizing downtime in operation of a door system, the electronic device comprising a memory and a processing circuitry configured to cause the electronic device to obtain a status pattern associated with the operation of the door system and associate the obtained status pattern with a door system identification information. The electronic device is then configured to determine if the obtained status pattern is associated with any of at least one reference status pattern, by comparing the obtained status pattern with the at least one reference status pattern. The electronic device is further configured to associate the determined reference status pattern with the door system identification information and generate door maintenance information based on the door system identification information and the determined status pattern association. An advantage with the electronic device is that with help from the status pattern, the electronic device can determine the status of a certain door system and also predict e.g. when in time a certain service is needed in order to reduce the downtime of the operation of the door system.

The present invention relates to different aspects including the method described above and in the following, and corresponding methods, devices, electronic devices, systems, networks, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The present invention relates to door systems 100a, 100b, 100c, 100d, door operators 1 for different types of doors, door sets and door leafs 5. More specifically, the invention relates to door operators 1 for any type of door, a sectional door, a high speed door, a gate or barrier obstructing passage, such as a revolving door, a swing door, a hinged door, an up and over door, a roll door, a garage door, an industrial door, a gate, a barrier, an or any device having the same function as a door.

According to an aspect the door operator 1 is a revolving door operator, a swing door operator, a hinged door operator, an up and over door operator, a roll door operator, a garage door operator, an industrial door operator, a gate operator, a barrier operator, or any device having the same function as a door operator. According to an aspect, the door operator is arranged at a loading dock.

Figure 1A:
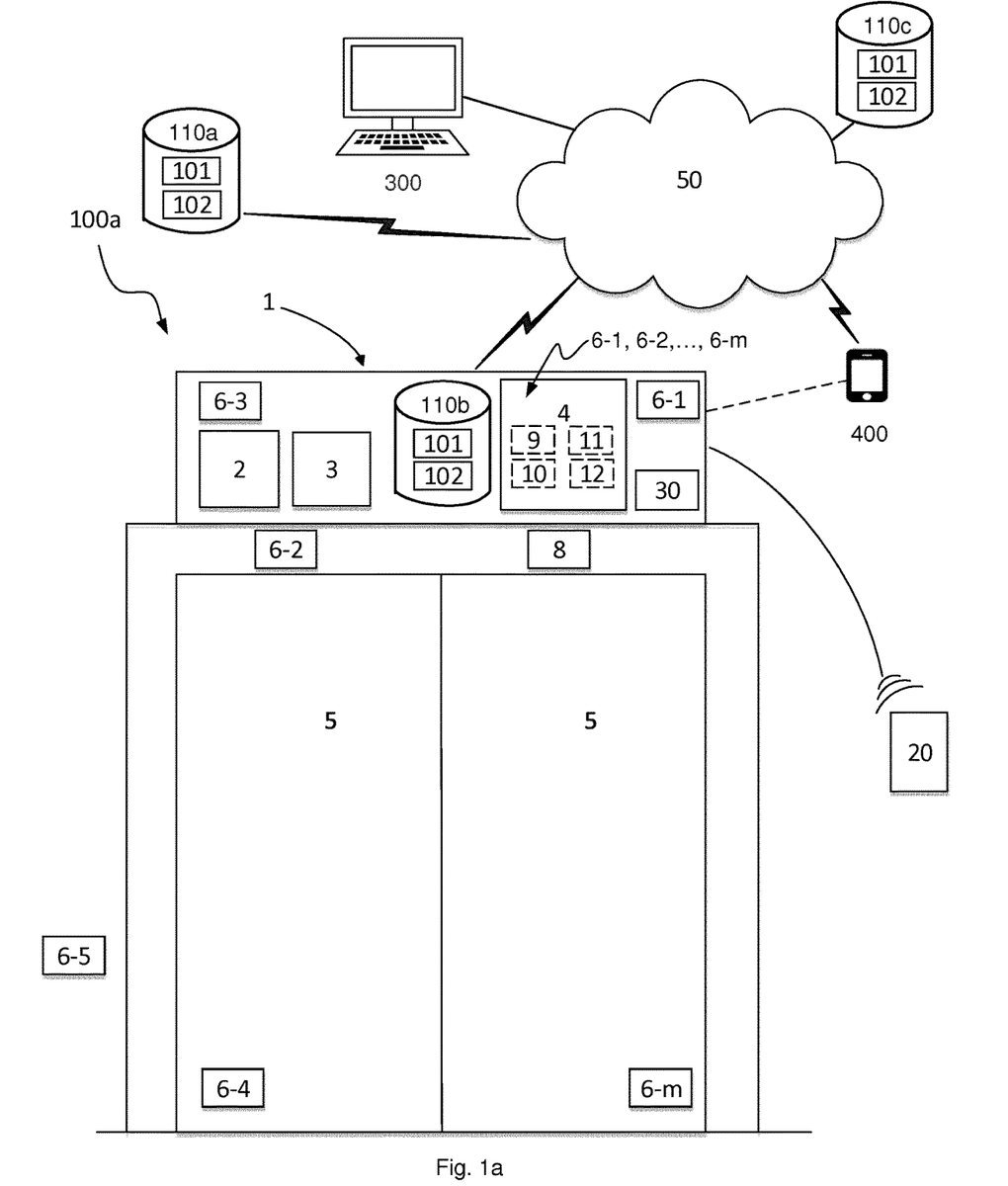
FIG. 1a illustrates an exemplary system suitable for implementing the proposed method.
Figure 2:
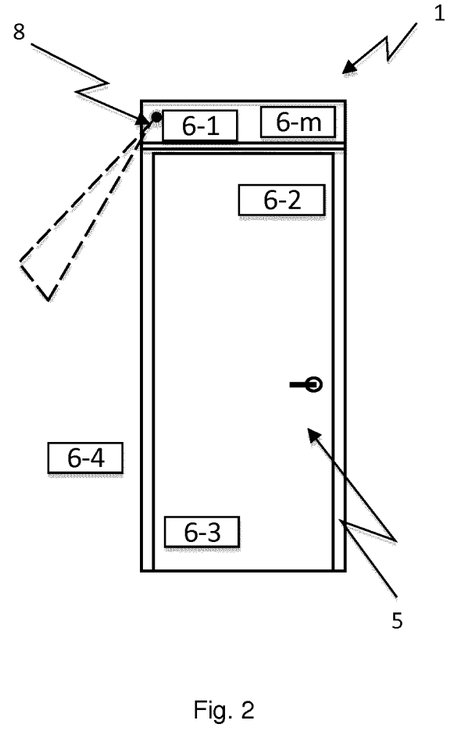
FIG. 2 shows a schematic view of a swing door and a door operator in accordance with an aspect of the invention.
Figure 3:
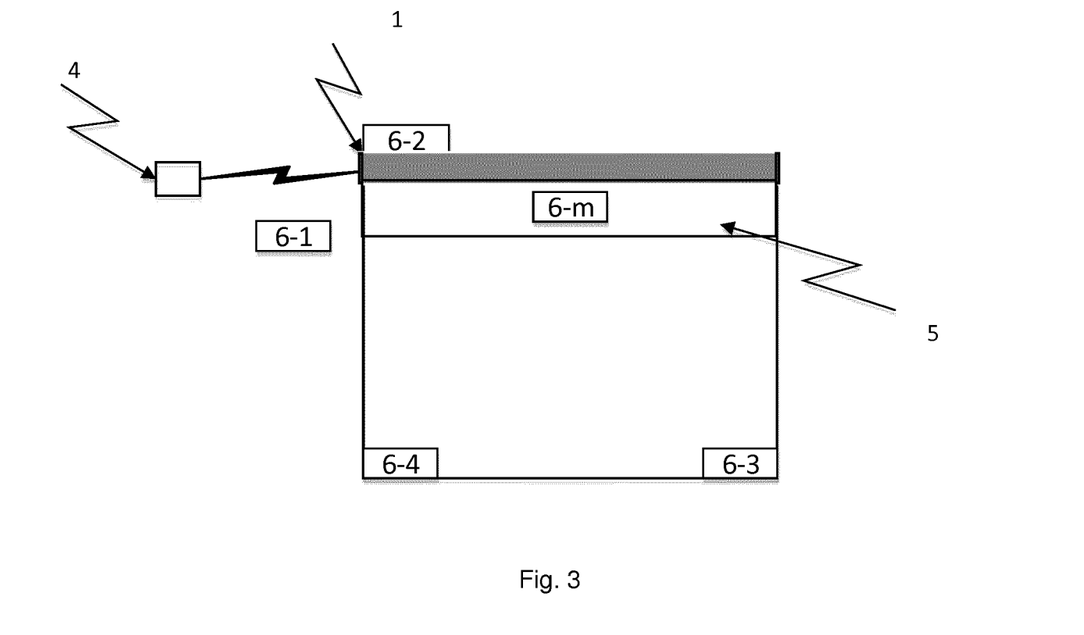
FIG. 3 shows a schematic view of a roll door and a door operator in accordance with an aspect of the invention.

According to some aspects of the disclosure, a door system 100a, 100b, 100c, 100d comprises one or more door operators 1 connected to one or more door leafs 5. The door operator 1 disclosed in FIG. 1a is a sliding door operator 1 connected to two door leafs 5. The door operator 1 disclosed in FIG. 2 is a swing door operator 1 connected to a door leaf 5. The door operator 1 disclosed in FIG. 3 is a high speed door operator 1 connected to a door leaf 5.

FIG. 1a discloses the door operator 1 comprising a drive unit 2, a control unit 3 and a supervise unit 4. The door operator 1 further comprises one or more of a battery (not disclosed), a belt transmission (not disclosed), a carriage wheel (not disclosed), an arm systems (not disclosed) and activation sensors (not disclosed). These components as such are known in the art and will not be described in detail herein. The door operator can also comprise further components.

The drive unit 2 is connected to the control unit 3. The drive unit 2 comprise a motor and a gearbox. The drive unit 2 is adapted to be connected to a door/door leaf/door set 5 and to move the door leaf 5 between an open and closed position, i.e. from an open position to a closed position and from a closed position to an open position. The drive unit 2 as such, its connection to the door leaf 5 and its connection to and interaction with the control unit 3 is known in the art and will thus not be described in more detail herein.

The control unit 3 is connected to the drive unit 2. The control unit 3 is connected to the supervising unit 4. The connection between the control unit 3, drive unit 2 and the supervise unit 4 is an electronically connection. According to some aspects the control unit 3 is connected to the supervise unit 4, and the drive unit 2 via a wireless connection. The connection may also be a combination of wired and wireless connection. Examples of wireless connections are Bluetooth™, Wi-Fi, Infrared or any kind of near field communication technology.

According to some aspects the control unit 3 is directly connected to the supervise unit 4 and the drive unit 2. Directly connected means that the control unit 3 is in direct communication with the supervise unit 4 and the drive unit 2. Direct communication may occur both via a wired connection or a wireless connection or a combination of both. In the case of wireless connection there will be a transceiver for the wireless signal on both the control unit 3 sides, the drive unit 2 side and supervise unit 4 side. Data can be sent to and from the supervise unit 4, to the control unit 3 and to the drive unit 2. The control unit 3 comprise a central processor unit, CPU, not shown and a memory (not disclosed). The control unit 3 controls the movement of the drive unit 2. According to an aspect the supervise unit 4 is comprised in the control unit 2. According to an aspect the control unit 3 and the supervise unit 4 is an integrated unit.

The control unit 3 controls when the drive unit 2 should move the door leaf 5 between the open and closed position and how it should move it. The trajectory that the control unit 3 controls the drive unit 2 to move the door leaf 5 along comprise information of which speed the door leaf 5 should be moved, acceleration, braking, the opening time, for how long the door should be open and/or the closing speed etc. The control unit 3 can store different trajectories, at least a first and a second trajectory, and control the drive unit 2 to move the door leaf 5 along different trajectories. The control unit 3 is connected to one or more activation sensors 8 arranged to detect objects and persons approaching the door operator 1 and to send data to the control unit 3 if a person is detected.

The control unit 3 as such is known in the art and is not described in more detail herein. The door operator 1 further comprise one or more of a battery, a belt (not disclosed), transmissions (not disclosed), an arm system (not disclosed), one or more carriage wheels (not disclosed) and one or more sensors 8.

According to one aspect, the door leaf 5 is connected to one or more of the arm systems, floor guides and carriage wheels. The door operator 1 as such can comprise further features and component that is known in the art, and will thus not be further described herein. The door leaf 5 as such can comprise further features and component that is known in the art, and will thus not be further described herein.

The supervise unit 4 comprise one or more sensors 6-1, 6-2, . . . , 6-m and a status management unit 12. The supervise unit 4 comprise a central processor unit (CPU) 9 and a memory 10. According to an aspect, the supervise unit 4 comprise a storage unit 11.

The sensors 6-1, 6-2, . . . , 6-m are adapted to observe and provide sensor data of the operation of the door operator 1 and/or the operation of the door leaf 4. Put in another way, the sensors 6-1, 6-2, . . . , 6-m are arranged to create sensor data corresponding to the functionality of the operation of the door. By providing sensor data is meant that the sensor 6-1, 6-2, . . . , 6-m provide/create/measure/obtains/observe it's surrounding and components and create data of it that could be transferred. According to an aspect, the one or more sensors 6-1, 6-2, . . . , 6-m are configured to provide sensor data associated with the operation of the door operator 1 and/or the at least one door leaf 5. Sensor data is a digital version of the things that the sensors 6-1, 6-2, . . . , 6-m has observed and could be data comprising information of sound waves, temperature, vibration, number of cycles, current, voltage, inertia, light, light waves, pictures, acceleration, friction and many other things, encoder etc. of the components and areas that the sensor 6-1, 6-2, . . . , 6-m are sensing.

According to some aspects the one or more sensors 6-1, 6-2, . . . , 6-m is one of a sound sensor, a movement sensor, voltage sensor, current sensor, resistance sensor, temperature sensor, a light sensor, a pressure sensor, a humidity sensor, a time sensor, a global positioning system (GPS), infrared sensor, a camera, a ccd-camera, a time of flight sensor and/or ultrasonic sensor.

According to some aspects the one or more sensors 6-1, 6-2, . . . , 6-m are positioned at components 2, 3, 4, 7 of the door operator 1, on the door leaf 5 or at the vicinity of the door operator 1 and the door leaf 5.

According to some aspects of the disclosure the at least one sensor 6-1, 6-2, . . . , 6-m is connected to the status management unit 12. According to an aspect, the one or more sensors 6-1, 6-2, . . . , 6-m are arranged to send sensor data to the status management unit 12. The sensors 6-1, 6-2, . . . , 6-m are electronically connected to the status management unit 12. According to some aspects the sensors 6-1, 6-2, . . . , 6-m a connected to the status management unit 12, via a wireless connection suitable for sending electronic signals. The connection may also be a combination of wired and wireless connection. Examples of wireless connections are Bluetooth™, WiFi, Infrared or any kind of near field communication technology. According to some aspects the sensors 6-1, 6-2, . . . , 6-m is directly connected to the status management unit 12 of the supervise unit 4. Directly connected means that the sensors 6-1, 6-2, . . . , 6-m are in direct communication with the status management unit 12. Direct communication may occur both via a wired connection or a wireless connection or a combination of both. In the case of wireless connection there will be a transceiver for the wireless signal on both the sensor 6-1, 6-2, . . . , 6-m sides and the status management unit 12 side.

According to an aspect, data can be sent to and from the status management unit 12 to the sensors 6-1, 6-2, . . . , 6-m. The status management unit 12 does according to an aspect comprise a central processor unit (CPU) (not disclosed) and a memory (not disclosed).

According to an aspect, the door operator 1 comprises a user interface unit 20. The user interface unit 20 is connected to the supervise unit 4. The user interface unit 20 is configured to display an alarm based on the service alarm event, breakdown alarm event, and/or status event. According to an aspect, the user interface unit 20 could be a display and/or one or more lamps. According to one aspect, the user interface unit 20 comprise 3 lamps, a green lamp corresponding to the non-service event, a yellow lamp indicating the service alarm event and a red lamp indicating a breakdown event.

According to an aspect, the door operator 1 further comprise a communication interface 30 connected to the supervise unit 4 and configured to communicate with at least one remote entity over a communication network 50. In one example the communication network 50 is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network 50 can also be a combination of both a local area network and a wide area network. The communication network 50 can also be a wired network. According to some aspects of the disclosure the communication network 50 is defined by common Internet Protocols.

The communication interface 30 may comprise any number of tranceiving, receiving, and/or transmitting units or circuitry. According to some aspects the communication interface 30 is a radio communication interface. The radio communication interface 30 may be in the form of any input/output communications port known in the art. The radio communication interface 30 may comprise RF circuitry and baseband processing circuitry. The radio communication interface 30 may support either wireless and/or wired communication.

The status management unit 12 is configured to receive the sensor data from the one or more sensors 6-1, 6-2, . . . , 6-m. The status management unit 12 is configured to determine a status pattern of the operation of the door operator 1 and/or the door leaf 5 out of a plurality of status patterns of the operation of the door operator 1 and/or the door leaf 5 at least based on the received sensor data.

According to some aspects, the status pattern is a pattern found in the sensor data or associated with the sensor data. The status pattern could be a pattern of sounds in a certain order and at a certain frequencies. The status pattern could be a pattern from sensor data from one or more sensors. The status pattern could be a pattern from sensor data from different one or more sensors 6-1, 6-2, . . . , 6-m. The status pattern is a pattern that corresponds to one of a plurality of status patterns of the operation of the door operator 1 and/or the door leaf 5 at least based on the received sensor data. By determining a status pattern out of a plurality of status pattern a status of the door operator 1 and/or the door leaf 5 could be determined. According to some aspects, the determined status patterns is an indication of that something is wrong in the door operator 1 and/or the door leaf 5. Put in another way, by identifying and determining the status pattern out of the sensor data out of a plurality of status patterns the status of the door operator 1 could be determined. According to some aspects, the determined status patterns is an indication of that all is OK in the door operator 1 and/or the door leaf 5. According to some aspects, the determined status patterns is an indication of that something has broken in the door operator 1 and/or the door leaf 5.

According to some aspects, the plurality of status patterns are stored in the supervise unit 4. In an example the received sensor data is compared to the status pattern to determine if the received sensor data corresponds to any of the plurality of status patterns. If a status pattern is determined out of the plurality of status patterns as a known status of the door operator 1 and/or the door leaf 5 is identified. If the status management unit 12 identifies a status pattern in the received sensor data it will determine that the status pattern is associated with said sensor data.

A status event is a description of a number actions that will happen if something else happens. According to some aspects, a status event is connected to a status pattern. Put in another way, if a status pattern is identified and determined by the status management unit 12 and a status event is connected to said status pattern, the events connected to the status event will be performed if/when the status event is triggered.

According to an aspect, a status event could be a service alarm event. The service alarm event is at least associated with determination of a first status pattern out of the plurality of status patterns. A service alarm event could comprise events such that informing the service provider of the door operator 1 that the door operator needs service. This could be done by indicating that a service is needed on the user interface unit 20. This will inform a person responsible for the door operator 1 that a service is needed to avoid a breakdown of the door operator 1 and/or the door leaf 5. A service alarm event could comprise information of the importance of the service need, for instance it needs to have service within 1, 2 or 4 weeks.

According to an aspect, several different status patterns could be associated with a service alarm event identifying a need of service.

According to an aspect, the status event could comprise an action of sending information of the need for service directly to the service provider via the communication network 50.

According to an aspect, the status event could comprise information of which part of the door operator 1 and/or the door leaf 5 that has a need for service, either via the user interface unit 20 or directly to the service provider via the communication network 50. By identifying and indicating that the door operator 1 and/or door leaf 5 is in need of service reduces the downtime of a door operator 1 since it can receive service before a part breaks. Further, it also can reduce the cost of service since parts don't need to be replaced in advance and the service provider knows which parts that needs service before service stat arrives at the door operator 1 and can plan the service better and bring the correct components. According to some aspects of the disclosure a status event could comprise information for generating a door maintenance information.

According to an aspect, the status event is a non-service event. A non-service event indicates that the status of the door operator 1 and/or the door leaf 5 is OK or in normal operation and no service is needed. A non-service event could be identified or indicated via the user interface unit 20 or via the communication network 50. By receiving information of a non-service event one receives information of that the door operator 1 is working correct.

According to an aspect, the status event is a breakdown alarm event. A breakdown alarm event indicates that the status of the door operator 1 and/or the door leaf 5 is not OK or not in normal operation, and that it has stopped functioning. A breakdown alarm event could be identified or indicated via the user interface unit 20 or via the communication network 50. The breakdown alarm event is associated with a status pattern and the service provider could get information of the type of breakdown that has occurred and thus the breakdown could be solver quicker as the service provider could have the right equipment and spare parts with him the first time visiting the door operator 1.

The disclosure proposes a method performed in an electronic device 110a, 110b, 110c for minimizing downtime in operation of a door system 100a, 100b, 100c, 100d. FIG. 1a illustrates an exemplary system suitable for implementing the proposed method. The system comprises an electronic device 110a, 110b, 110c. According to some embodiments of the disclosure the method is performed in an electronic device 110a, 110b, 110c comprising a memory 101 and a processing circuitry 102. According to some aspects of the disclosure the electronic device 110a, 110b, 110c further comprising a user interface unit 20 for input and output of information via a graphical user interface. The memory 101 can be a Random-access Memory, RAM; a Flash memory; a hard disk; or any storage medium that can be electrically erased and reprogrammed. The processing circuitry 102 can be a Central Processing Unit, CPU, or any processing unit carrying out instructions of a computer program or operating system. According to some aspects of the disclosure the electronic device is a server 110a that is connected to the door system 100a, 100b, 100c, 100d via a communication network 50. According to some aspects of the disclosure the electronic device is a database 110c that is connected to the door system 100a, 100b, 100c, 100d via a communication network 50. According to some aspects of the disclosure the electronic device is a server 110b that is integrated in the door system 100a, 100b, 100c, 100d. According to some aspects of the disclosure the electronic device is an operator terminal 300, e.g. a computer or laptop, connected to the door system 100a, 100b, 100c, 100d via a communication network 50. According to some aspects of the disclosure the electronic device is a portable electronic device 400, e.g. a smartphone or tablet connected to the door system 100*a*, 100*b*, 100*c*, 100*d* via a communication network 50.

Figure 4:
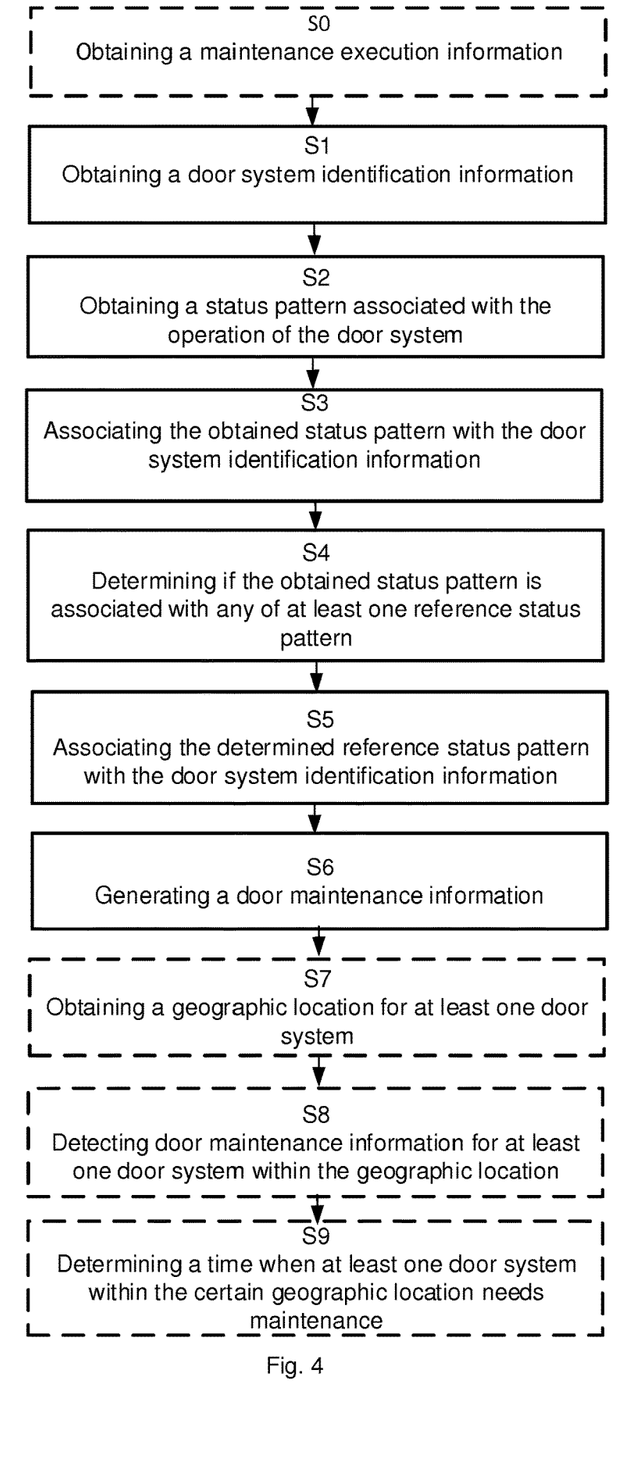
FIG. 4 illustrates a flow chart of the method steps according to some aspects of the disclosure.

Reference is now made to FIG. 4 for describing the different steps in the method according to some aspects of the disclosure. The disclosure proposes a method performed in an electronic device 110*a*, 110*b*, 110*c* for minimizing downtime in operation of a door system 100*a*, 100*b*, 100*c*, 100*d*.

Figure 5:
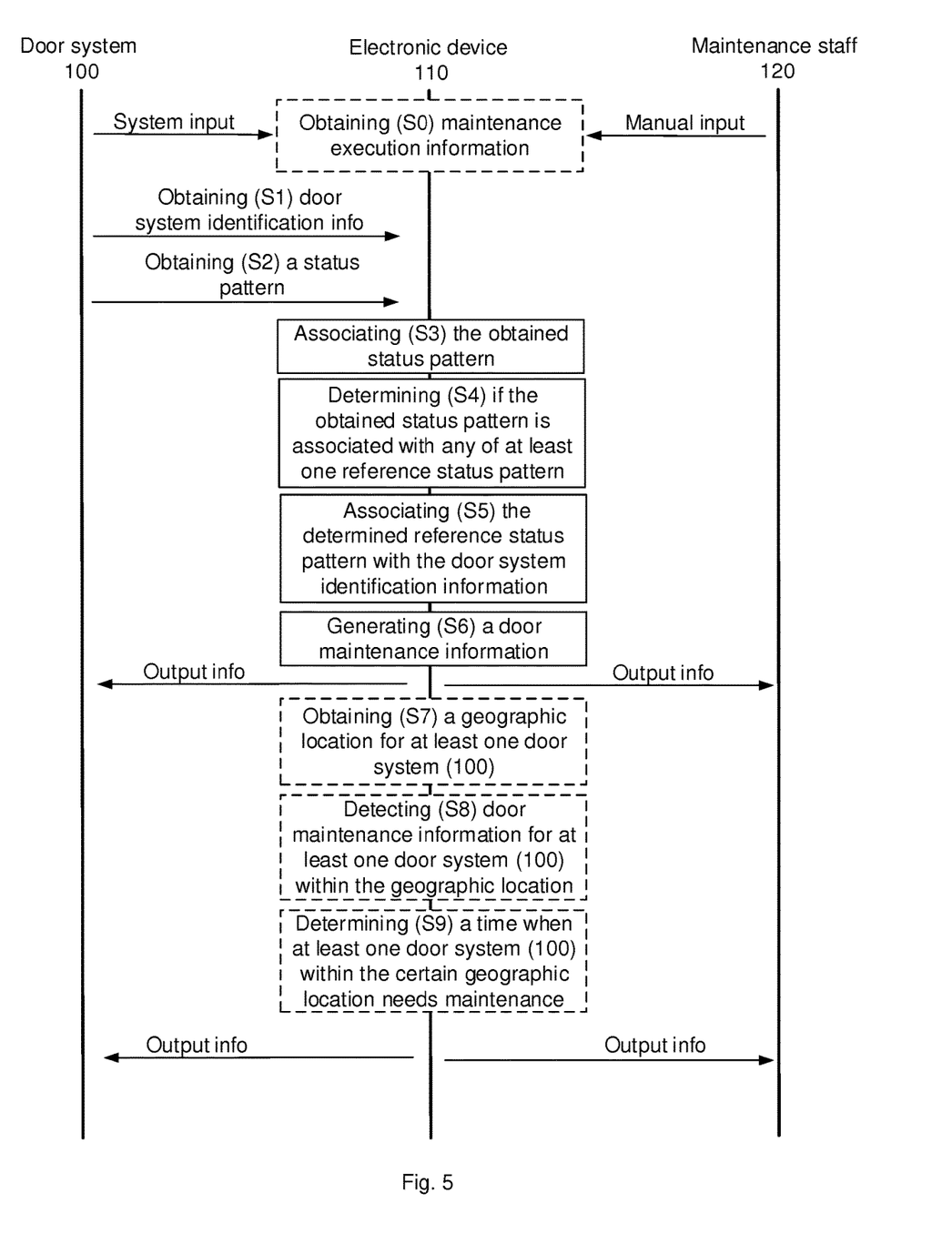
FIG. 5 illustrates a flow chart of the method steps according to some aspects of the disclosure.

In FIG. 4 the method starts with the step S0 of obtaining a maintenance execution information. According to some aspects of the disclosure the maintenance execution information comprises information related to a service or maintenance that has been carried out on the door system 100*a*, 100*b*, 100*c*, 100*d*. According to some aspects the service or maintenance is performed by service staff. In an example a component is replaced with a new component. In an example, adjustments have been made to e.g. a movable mechanical part. In an example adjustments in e.g. control of an electronic motor is made. All these examples are made by a service staff that is physically visiting the door system 100*a*, 100*b*, 100*c*, 100*d*. In an example a software update to a door system 100*a*, 100*b*, 100*c*, 100*d* is provided from a server 110*a* via the communication network 50 without service staff that is physically visiting the door system 100*a*, 100*b*, 100*c*, 100*d*. Reference is now made to FIG. 5. According to some aspects of the disclosure obtaining the maintenance execution information is made by manual input of information. Maintenance execution information can for example be created by service staff 120 that has completed a service or maintenance and enters information relating to the service or maintenance to a server 110*a*. The information can for example be inputted via a user interface on a portable electronic device 400, such as a tablet or smartphone, or a via a user interface on an operator terminal 300.

The service staff 120 can enter information about what service or maintenance that has been carried out. For example the service staff can enter what component(s) that has been replaced, adjustments made, settings etc. As illustrated in FIG. 5. the manual input can be done at the door system 100*a*, 100*b*, 100*c*, 100*d* when the service staff 120 has for example connected a portable electronic device 400, such as a tablet or smartphone, to the door system 100*a*, 100*b*, 100*c*, 100*d* via a wired connection. The manual input can also be done wirelessly over a communication network 50 at remote location at a later point in time for example using a portable electronic device 400, such as a tablet or smartphone.

According to some aspects obtaining maintenance execution information is made by the door system 100*a*, 100*b*, 100*c*, 100*d* itself by a system input from the door system 100*a*, 100*b*, 100*c*, 100*d* to e.g. a server 110*a* as illustrated in FIG. 5. In one example a component in the door system 100*a*, 100*b*, 100*c*, 100*d* is replaced. When the new component is installed, the new component can send its identification information to e.g. a server 110*a* or operator terminal 300 via the communication network 50. In one example a software is updated in the door system 100*a*, 100*b*, 100*c*, 100*d*, for example the software for operating the supervise unit 4 is updated. The service staff can in an example initiate a software update via a user interface on a portable electronic device 400 such as a tablet or smartphone connected to the door system 100*a*, 100*b*, 100*c*, 100*d* via a wired connection or connected to the door system 100*a*, 100*b*, 100*c*, 100*d* via a communication network 50. When the software is updated, information of e.g. the software version can be sent from the door system 100*a*, 100*b*, 100*c*, 100*d* to a server 110*a* via the communication network 50.

Figure 1B:
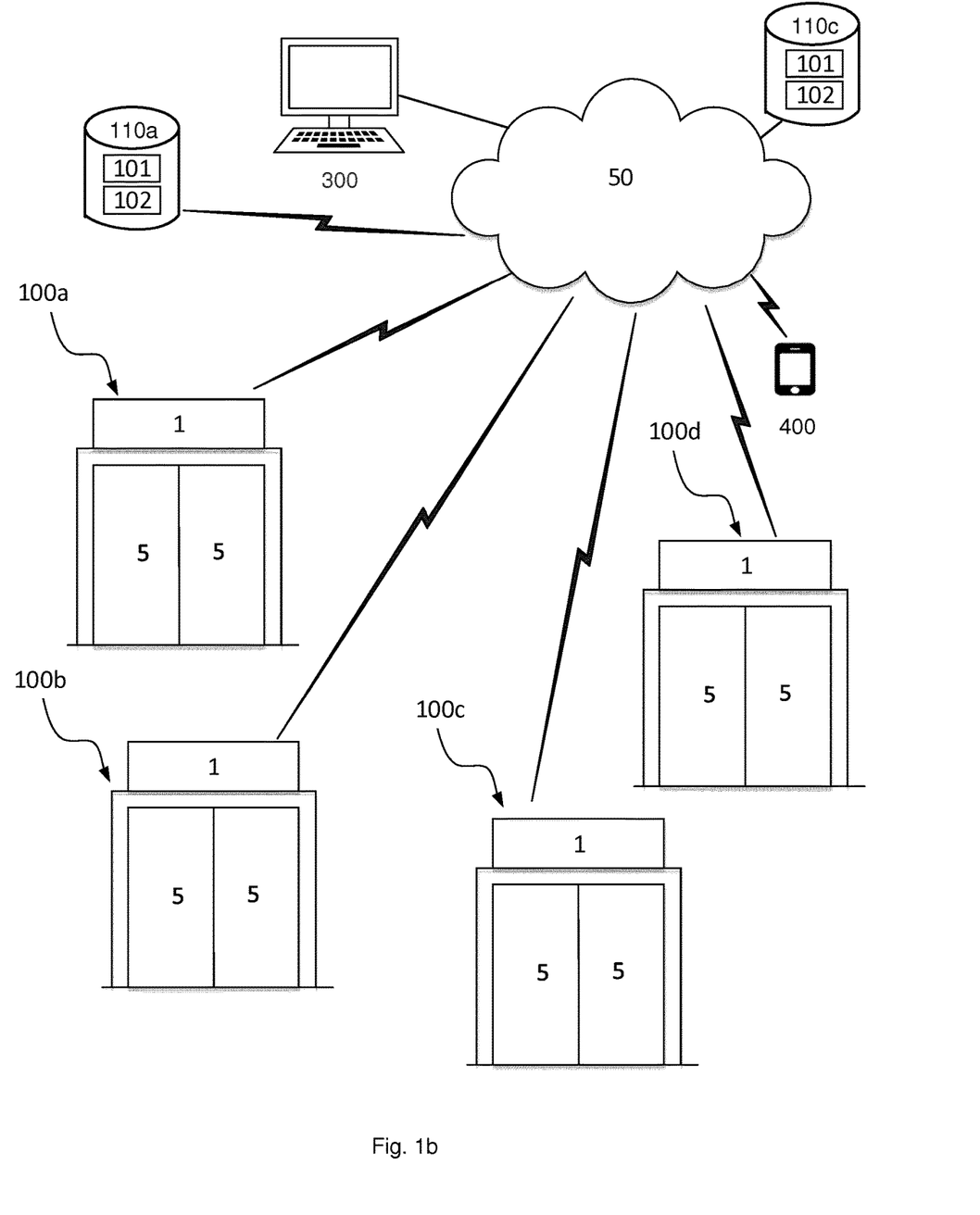
FIG. 1b illustrates an exemplary system suitable for implementing the proposed method.

As illustrated in FIG. 4, the method is then followed by obtaining S1 a door system identification information. According to some aspects of the disclosure the door system identification information is obtained from a local database 110*b* located in the door system 100*a*, 100*b*, 100*c*, 100*d*. According to some aspects of the disclosure the door system identification information is obtained via the communication network 50. According to some aspects of the disclosure the door system identification information is obtained from a server 110*a* or database 110*c*. In an example the door system identification information is obtained from a portable electronic device 400 or operator terminal 300. The door system identification information is in an example comprising information relating to a door system 100*a*, 100*b*, 100*c*, 100*d* and any component in the door system 100*a*, 100*b*, 100*c*, 100*d*. As illustrated in FIG. 1*b* a plural door systems 100*a*, 100*b*, 100*c*, 100*d* are connected to at least one electronic device 110*a*, 110*b*, 110*c* via a communication network 50 and plural door system identification information is obtained from the plural door systems 100*a*, 100*b*, 100*c*, 100*d*.

Examples of door system identification information is a door serial number information, a door model number information, a door type information, door size information, door weight information, door owner information, position data information about where the door is installed, installation date information, last service or maintenance date information, software version information, warranty data information, component identification information, spare part information. The door system identification information is in an example comprising information relating to a environmental information of the door system 100*a*, 100*b*, 100*c*, 100*d* such as temperature information, average temperature information, average temperature information over long and short cycles, humidity information, and atmospheric pressure information, wind speed information, light condition information.

According to some aspects of the disclosure plural door system identification information can be filtered and sorted. In an example plural door systems 100*a*, 100*b*, 100*c*, 100*d* within a certain geographic location information can be filtered out based on a geographic location information in the plural door system identification information.

According to some aspects of the disclosure, the door system identification information is entered via manual input to a server 110*a*, database 110*c* or a local database 110*b* in the door system 100*a*, 100*b*, 100*c*, 100*d*.

The method illustrated in FIG. 4 is then followed by obtaining S2 a status pattern associated with the operation of the door system 100*a*, 100*b*, 100*c*, 100*d*. According to some aspects of the disclosure a status pattern is a pattern found in the sensor data or associated with the sensor data. As illustrated in FIG. 1*b* a plural door systems 100*a*, 100*b*, 100*c*, 100*d* are connected to at least one electronic device 110*a*, 110*b*, 110*c* via a communication network 50 and plural status patterns associated with the operation of each door systems are obtained from the plural door systems 100*a*, 100*b*, 100*c*, 100*d*. According to some aspects of the disclosure a status pattern associated with the operation of each door system 100*a*, 100*b*, 100*c*, 100*d* is continuously obtained and updated. According to some aspects of the disclosure plural status patterns are obtained and stored in at least one electronic device 110*a*, 110*b*, 110*c* for further processing. In an example an obtained status pattern is temporarily stored and later replaced by a more recent status pattern.

According to some aspects of the disclosure the status pattern is based on at least one sensor data. The status pattern could be a pattern from sensor data from one or more sensors. The status pattern could be a pattern from sensor data from different one or more sensors 6-1, 6-2, ..., 6-m. In an example the status pattern is a pattern that corresponds to one of a plurality of status patterns of the operation of the door operator 1 and/or the door leaf 5 at least based on the received sensor data. In an example the status pattern could be a pattern of sounds in a certain order and at a certain frequencies. According to an aspect, one or more of the one or more 6-1, 6-2, ..., 6-m is a sound sensor. The sound sensor 6-1, 6-2, ..., 6-m is arranged to provide sensor data associated with noise associated with the gear box of the door operator 1.

According to an aspect the sound sensor 6-1, 6-2, ..., 6-m is a microphone 6-1, 6-2, ..., 6-m.

According to an aspect, the status management unit 12 receives the sensor data from the sound sensor 6-1, 6-2, ..., 6-m and determine one or more status patterns associated with specific identified sounds of the door operator 1 associated with the gear box. According to an aspect, one or more status patterns are associated with specific identified sound patterns of the door operator 1 associated with the gear box. The specific sounds or sound patterns of the gear box could be an indication of that there is something wrong with the gear box. According to an aspect, the status management unit 12 determines a status pattern that is associated with a specific sound or sound pattern of the gear box that associated with some kind of fault in the gear box.

According to one aspect, one or more of the one or more sensors 6-1, 6-2, ..., 6-m is a resistance sensor. The resistance sensor 6-1, 6-2, ..., 6-m is configured to observe and obtain status data associated with the inner resistance of the battery of the door operator 1. The sensor data associated with the inner resistance of the battery is measured and obtained by a very short and high current peek (10 C for 100 ms). The obtaining of the sensor data will not affect the capacity of the cell of the battery and therefore the sensors 6-1, 6-2, ..., 6-m will obtain a sensor data corresponding to/associated with the inner resistance of the battery.

According to an aspect, one or more of the one or more sensors 6-1, 6-2, ..., 6-m is a temperature sensor. According to an aspect, one or more of the one or more sensors 6-1, 6-2, ..., 6-m is a charge level sensor. The temperature sensor 6-1, 6-2, ..., 6-m is arranged to obtain sensor data that is associated with the temperature of the battery. The charge level sensor 6-1, 6-2, ..., 6-m is arranged to obtain sensor data that is associated with the charge level of the battery.

According to an aspect, one or more of the one or more sensors 6-1, 6-2, ..., 6-m is a battery capacity sensor. The battery capacity sensor 6-1, 6-2, ..., 6-m is arranged to provide sensor data associated with the capacity of the battery.

According to an aspect, one or more of the one or more sensors 6-1, 6-2, ..., 6-m is a voltage sensor. The voltage sensor is arranged to provide sensor data associated with that the battery comprise on or more dead battery cells (not disclosed). According to an aspect, dead battery cells can be identified by the voltage sensor 6-1, 6-2, ..., 6-m obtaining sensor data associated with the voltage of a battery that have been disconnected from load and charging during 10 minutes. The cell voltage will harmonize around a predetermined voltage per cell and together with sensor data associated with the temperature of the battery sensor data associated with the number of active cells can be calculated.

According to some aspects of the disclosure a certain status pattern can be described by a function f(x,y,z) depending on sensor data collected from plural sensors 6-1, 6-2, ..., 6-m.

In an example the function can be described by a function f(x",y",z") where:
x"=sound sensor data
y"=voltage sensor data
z"=temperature sensor data Over time a door system 100a, 100b, 100c, 100d generates plural sensor data from the plural sensors 6-1, 6-2, ..., 6-m dependent on operation of the door system 100a, 100b, 100c, 100d.

Figure 6A:
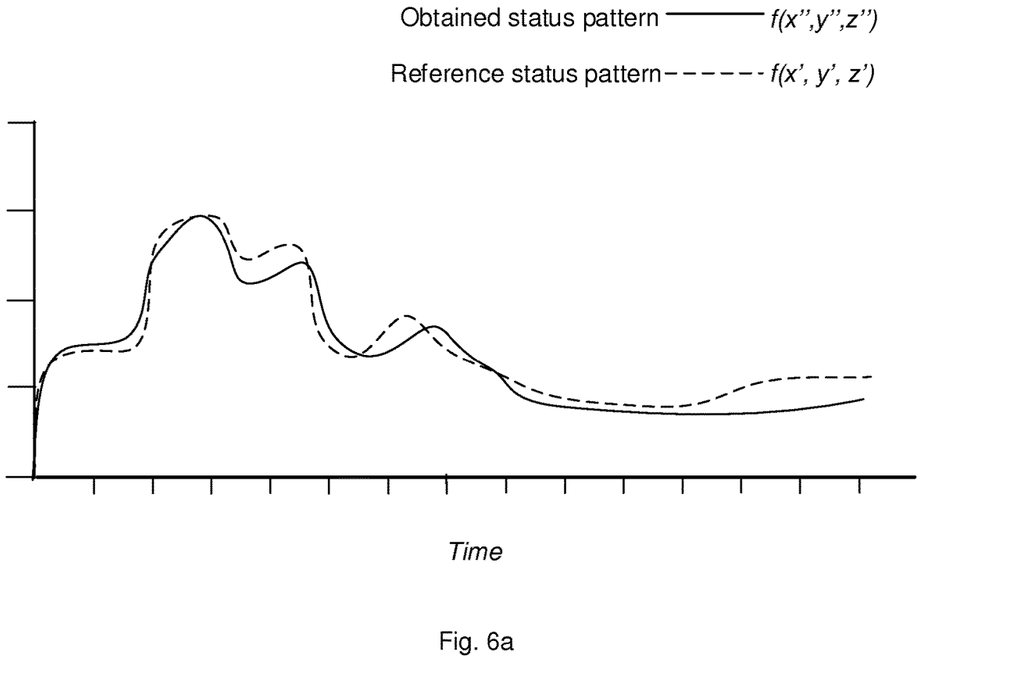
FIG. 6a illustrates a curve described by the function f(x",y",z") according to some aspects of the disclosure.

FIG. 6a illustrates a curve described by the function f(x",y",z"). The curve described by the function f(x",y",z") illustrated in FIG. 6a can in an example refer to the status pattern when a door is closed. In this example FIG. 6a also illustrates a reference status pattern f(x', y', z'). According to some aspects of the disclosure a reference status pattern f(x', y', z') is based on a least one previous obtained status pattern. According to some aspects of the disclosure the reference status pattern is a particular pattern generated by sensors that has become known from a previous operation and associated with a certain status of the door system 100a, 100b, 100c, 100d. According to some aspects of the disclosure reference status pattern is associated with at least one of a service event information; a no service event information; or a breakdown event information.

According to some aspects of the disclosure the reference status pattern is associated with a certain operation of the door system 100a, 100b, 100c, 100d. According to some aspects of the disclosure the reference status pattern is associated with a certain measure taken due to a certain event during operation of the door system 100a, 100b, 100c, 100d.

As illustrated in FIG. 4, after obtaining S2 a status pattern associated with the operation of the door system 100a, 100b, 100c, 100d the method is then associating S3 the obtained status pattern with the door system identification information. According to some aspects of the disclosure the association is stored in the memory 101 of the electronic device 110a, 110b, 110c. In an example the obtained status pattern is associated with a certain a door serial number information. Hence, the operation of a certain door system 100a, 100b, 100c, 100d can be monitored. In an example the obtained status pattern is associated with, a door type information, and hence the certain door type can be monitored. According to some aspects of the disclosure plural door systems 100a, 100b, 100c, 100d having the same door type information can be monitored. In an example plural obtained status patterns are associated with plural door systems 100a, 100b, 100c, 100d having the same door type.

The method is determining S4 if the obtained status pattern is associated with any of at least one reference status pattern, by comparing the obtained status pattern with the at least one reference status pattern.

According to some aspects of the disclosure a reference status pattern is a status pattern that is known from a previous obtained status pattern. According to some aspects of the disclosure a reference status pattern is a status pattern that has similar characteristics as a previous obtained status pattern. According to some aspects of the disclosure plural previously obtained status patterns are used to create a reference status pattern. In an example plural status patterns are compared and average status pattern is used to create a reference status pattern. In an example the a reference status pattern is associated with a certain event in the operation of a door system 100a, 100b, 100c, 100d and a certain event information is available that is associated with the reference status pattern. With knowledge of a certain reference status pattern and a certain event in the operation of a door system 100a, 100b, 100c, 100d a prediction of future service and/or maintenance of the certain door system 100a, 100b, 100c, 100d is possible.

Figure 6B:
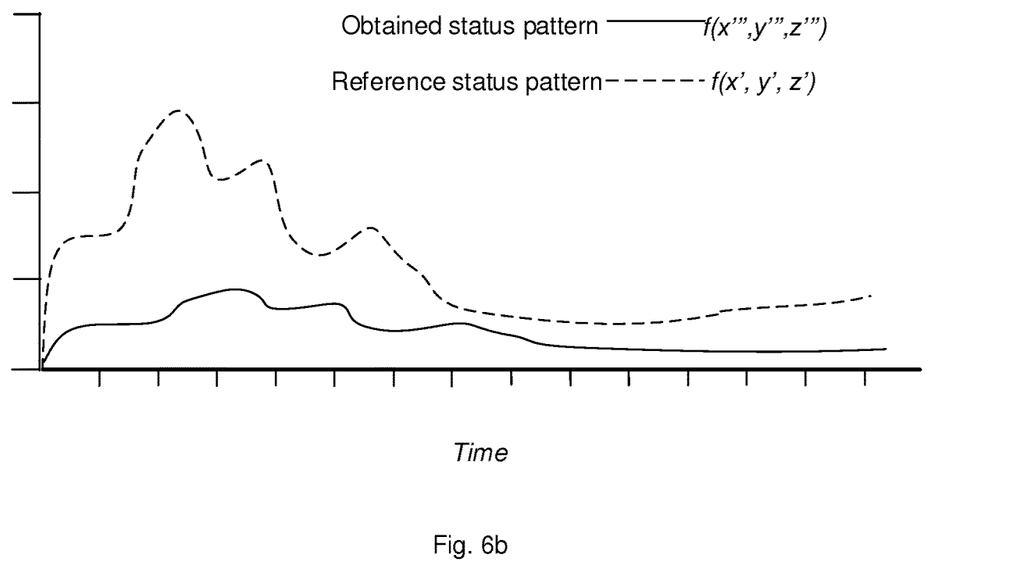
FIG. 6b illustrates a curve described by the function f(x",y",z") according to some aspects of the disclosure.

According to some aspects of the disclosure the method comprises obtaining sensor data (x",y",z") for calculating the function f(x",y",z"). The outcome of the calculation, e.g. a curve describing the function, is then compared with e.g. a curve of the function described by a reference status pattern f(x', y', z'). If both curves are within a certain confidence interval, e.g. 85%, it is determined that the obtained status pattern f(x",y",z") is associated with the reference status pattern f(x', y', z'). An example of two such curves are visualized in FIG. 6a. On the other hand, if the curves are not within a certain confidence interval it is determined that the obtained status pattern f(x",y",z") is not associated with the reference status pattern f(x', y', z'). Example of such curves are illustrated in FIG. 6b.

Following the flow chart in FIG. 4 the method is then followed by associating S5 the determined reference status pattern with the door system identification information. This means that it is determined that the obtained status pattern, originally generated by use of sensor data from a particular door system 100a, 100b, 100c, 100d, has the same characteristics as a particular reference status pattern. With the knowledge about a certain event information associated with the particular reference status pattern, a service or maintenance of the door system 100a, 100b, 100c, 100d can now be predicted. In the next step the method is generating S6 a door maintenance information. An advantage with the method is that with help from the status pattern, the method can determine the status of a certain door system and predict e.g. when in time a certain service is needed in order to reduce the downtime of the operation of the door system.

According to some aspects of the disclosure, generating the door maintenance information is based on at least one of a door system identification information; a determined status pattern association; and/or a maintenance execution information.

In an example plural door systems 100a, 100b, 100c, 100d with the same door type information have had the same status pattern at a certain time that has been followed by another type of status pattern at another certain time. In an example the detected operation of the door system 100a, 100b, 100c, 100d having a certain obtained status pattern indicates that the door system 100a, 100b, 100c, 100d is in the beginning of a change of operation that will within a certain time period lead to a breakdown if no service is performed on the particular door system 100a, 100b, 100c, 100d based on previously obtained status patterns over time for the same door type. In an example, based on plural previous maintenance execution information relating to the same door type, information regarding e.g. a software update or components replaced after a certain status pattern was obtained can be aggregated for generating the door maintenance information.

In an example a door maintenance information comprising:
- door model number information
- door type information
- door size information
- door weight information
- position data information about where the door is installed
- list of components replaced in door systems with the same door type information having the same reference status pattern association
- estimated time to perform service before risk of breakdown based on the current status pattern According to some aspects of the disclosure plural door systems 100a, 100b, 100c, 100d generates plural door system identification information and/or a maintenance execution information. This information is obtained from the plural door systems 100a, 100b, 100c, 100d and stored in the electronic device 110a, 110b, 110c for future prediction of maintenance and/or service needed for other door systems 100a, 100b, 100c, 100d. In FIG. 1b a plural door systems 100a, 100b, 100c, 100d are connected to at least one electronic device 110a, 110b, 110c via a communication network 50. According to some aspects of the disclosure, data from plural door systems 100a, 100b, 100c, 100d can be stored in plural electronic devices 110a, 110b, 110c.

In an example a certain door type is known for having a certain status pattern after a certain time of operation. The existing maintenance execution information from plural such particular door systems 100a, 100b, 100c, 100d supports the generation of door maintenance information. According to some aspects of the disclosure, a particular reference status pattern is associated with plural existing maintenance execution information from plural such particular door systems 100a, 100b, 100c, 100d.

In an example of the method, the door system identification information, e.g. information about a certain model or type of door, is used to identify similar door systems 100a, 100b, 100c, 100d and then compare what service or maintenance that has been carried out on these door systems 100a, 100b, 100c, 100d with a positive result and then use this data to suggest or recommend a certain service or maintenance to be carried out on the particular door system 100a, 100b, 100c, 100d in question. The determined status pattern association can be used to determine a status of the door system 100a, 100b, 100c, 100d and indicate what the next action is. Maintenance execution information, i.e. information on what service or maintenance that has been carried out on other door systems 100a, 100b, 100c, 100d or the specific door system in question can be used to extract information on e.g. what certain component that should be replaced etc. With this information, prediction of service or maintenance can be more accurate and addressed to the specific door system.

According to some aspects of the disclosure the door system comprising at least a door leaf and/or a door operator. The door system can hence operate the closing or opening of the door leaf. The door system may comprise other elements or components. According to some aspects of the disclosure, the obtained status pattern comprising sensor data associated with the operation of the door system 100a, 100b, 100c, 100d. Hence, the operation of the door system 100a, 100b, 100c, 100d can be monitored by at least one sensor device and the sensor data generated from the at least one sensor device 6-1, 6-2, . . . , 6-m can be described e.g. by a mathematical function and be compared with other sensor data generated by other door systems 100a, 100b, 100c, 100d.

According to some aspects of the disclosure the reference status pattern is at least one of a first reference status pattern, a second reference status pattern or a third reference status pattern. Hence, plural reference status patterns can exist and further reference status patterns can be added. According to some aspects of the disclosure the reference status pattern is associated with at least one of a service event information;

a no service event information; or a breakdown event information. A service event information can indicate a certain service that is applicable for a certain status pattern. The no service event information can give a feedback that the door is operating as normal and no additional service is needed for a certain status pattern. A breakdown information can indicate that a service is needed urgently for a certain status pattern. An advantage with the associations, is that a more accurate information can be given when generating the door maintenance information.

According to some aspects of the disclosure the door maintenance information comprising at least one of: a component replacement information; a service maintenance information; data software update information; system adjustment information; a parameter setting information; and/or a service time information. With detailed information, the planning and execution of the service or maintenance becomes cheaper and faster. According to some aspects of the disclosure the door maintenance information comprising a defined set of information fields in a message. In an example the door maintenance information is presented via a user interface on an operator terminal 300 or on a portable electronic device 400. In an example service staff can request the door maintenance information or the door maintenance information can also be pushed as a message to a service staff and displayed via a user interface on an operator terminal 300 or on a portable electronic device 400.

According to some aspects of the disclosure, and as illustrated in FIG. 4, the method then further comprising obtaining S7 a geographic location for at least one door system 100*a*, 100*b*, 100*c*, 100*d* based on the door system identification information. In an example the geographic location can be based on address information, and/or a detailed position data describing in what building, at what floor, what office etc. where the door system has been installed. This information is given in the door system identification information. The method, as illustrated in FIG. 4, is then followed by detecting S8 door maintenance information for at least one door system 100*a*, 100*b*, 100*c*, 100*d* within the geographic location. Any door maintenance information available that is associated with a certain geographic location of the at least one door system 100*a*, 100*b*, 100*c*, 100*d* is detected. The method then further comprising determining S9 a time when at least one door system 100*a*, 100*b*, 100*c*, 100*d* within the certain geographic location needs maintenance based on the door maintenance information for the at least one door system 100*a*, 100*b*, 100*c*, 100*d*.

In an example estimated time to perform service before risk of breakdown is included in the door maintenance information. In an example there are plural different door maintenance information available for plural door systems 100*a*, 100*b*, 100*c*, 100*d* within a certain geographic location, and then the time to perform service may vary. In an example the shortest time to perform service is setting the bar for when service is predicted to be carried out on the plural door systems 100*a*, 100*b*, 100*c*, 100*d* within a certain geographic location. In an example and as illustrated in FIG. 5 the information regarding a time when at least one door system 100*a*, 100*b*, 100*c*, 100*d* within a certain geographic location needs maintenance can be outputted, "output info" and e.g. presented on a user interface unit 20. In an example the information "output info" is outputted via a user interface on an operator terminal 300 or on a portable electronic device 400 as illustrated in FIG. 1. In an example service staff can use the information for planning of routes and ordering needed components etc. Hence, with detailed information about position information and time information, the planning and execution of the service or maintenance becomes more cost effective and faster and utilization of service staff hours can be optimized based on geographic position information.

According to some aspects of the disclosure, the method further comprising determining if plural door systems 100*a*, 100*b*, 100*c*, 100*d* within the certain geographic location needs maintenance within a certain time period based on door maintenance information for the plural door systems 100*a*, 100*b*, 100*c*, 100*d*. In an example service staff can request door maintenance information for door systems 100*a*, 100*b*, 100*c*, 100*d* within the certain geographic location for planning of maintenance and service of door systems 100*a*, 100*b*, 100*c*, 100*d*. This means that plural door systems 100*a*, 100*b*, 100*c*, 100*d* can get service or maintenance at the same time within the same graphical location and thereby making maintenance and service of the door system 100*a*, 100*b*, 100*c*, 100*d* efficient and cost effective. The planning and execution of the service or maintenance becomes more cost effective and faster and utilization of service staff hours can be optimized based on geographic position information.

According to some aspects of the disclosure, the method further comprising generating a reference status pattern based on at least one previous obtained status pattern. An advantage with this is that a new reference status pattern can be generated. A new reference status pattern can relate to a status pattern that has become known after understanding that the particular status pattern has characteristics that is associated with a certain service or maintenance action or if the door system 100*a*, 100*b*, 100*c*, 100*d* is in normal operation. Hence, a new reference status pattern can be generated and associated with a certain status information in order to generate a more accurate door maintenance information. According to some aspects of the disclosure plural reference status patterns are generated based on plural obtained status patterns.

According to some aspects of the disclosure, the method further comprising generating a reference status pattern based on at least one previous obtained status pattern and a maintenance execution information. This means that with knowledge about a certain service or maintenance that has been carried out on a certain door system 100*a*, 100*b*, 100*c*, 100*d* that before the service or maintenance had a certain obtained status pattern, the generation of a new reference status pattern can take the obtained status pattern and associate that status pattern with a certain type of status. According to some aspects of the disclosure plural reference status patterns are generated based on plural obtained status patterns and plural maintenance execution information. According to some aspects of the disclosure input of maintenance execution information automatically generates a new reference status pattern based on at least one previous o obtained status pattern, the a new reference status pattern is associated with information from the maintenance execution information. In an example a breakdown event of a door system 100*a*, 100*b*, 100*c*, 100*d* without a foregoing prediction of service or maintenance is used for generating a new reference status pattern. In an example a service or maintenance event of a door system 100*a*, 100*b*, 100*c*, 100*d* is observed by input of a maintenance execution information.

According to some aspects of the disclosure, the method further comprising obtaining a maintenance execution information and obtaining an updated status pattern associated with the operation of the door system. Maintenance execution information describing what service or maintenance that has been carried out can be obtained either by manual input by service staff or by system input, e.g. a new component that is connected to a system bus or e.g. a software upgrade to a new version. Hence, when maintenance execution information is obtained an updated status pattern can be obtained in order to e.g. verify or control if the service or maintenance that has been carried out have had an impact of the operation of the door system or not.

According to some aspects of the disclosure, the method further comprising obtaining maintenance execution information comprising information regarding executed maintenance associated with the door system identification information and obtaining an updated status pattern associated with the operation of the door system 100a, 100b, 100c, 100d. The method then further comprising determining if the updated status pattern is associated with the reference status pattern that is a no service event followed by associating the maintenance execution information message with the obtained status pattern if the updated status pattern is associated with a reference status pattern that is a no service event. Hence, after obtaining maintenance execution information and an updated status pattern associated with the operation of the door system 100a, 100b, 100c, 100d the method then verifies or controls if the service or maintenance that has been carried out have had a positive impact on the operation of the door system 100a, 100b, 100c, 100d. This is done by determining if the updated status pattern is associated with a reference status pattern that is associated with a no service event meaning that no service is needed. This information is not only usable to understand that the door system 100a, 100b, 100c, 100d is back to a normal operation mode after the service, but also for the system to learn by associating a certain maintenance execution information with a certain status pattern in order to generate door maintenance information that contains a more detailed information about what service or maintenance that is needed when a certain status pattern is obtained in the future.

According to some aspects of the disclosure the door operator 1, for moving at least one door leaf 5 between a closed and an open position, comprising a drive unit 2, a control unit 3 and an supervise unit 4.

According to some aspects of the disclosure the supervise unit 4 comprise one or more sensors 6-1, 6-2, . . . , 6-m configured to provide sensor data associated with the operation of the door operator 1 and/or the at least one door leaf 5.

The disclosure further proposes an electronic device 110a, 110b, 110c configured for minimizing downtime in operation of a door system 100a, 100b, 100c, 100d, the electronic device 110a, 110b, 110c comprising a memory 101 and a processing circuitry 102 configured to cause the electronic device 110a, 110b, 110c to obtain a status pattern associated with the operation of the door system 100a, 100b, 100c, 100d and associate the obtained status pattern with a door system identification information. The electronic device 110a, 110b, 110c is then configured to determine if the obtained status pattern is associated with any of at least one reference status pattern, by comparing the obtained status pattern with the at least one reference status pattern. The electronic device 110a, 110b, 110c is further configured to associate the determined reference status pattern with the door system identification information and generate door maintenance information based on the door system identification information and the determined status pattern association. An advantage with the electronic device 110a, 110b, 110c is that with help from the status pattern, the electronic device 110a, 110b, 110c can determine the status of a certain door system 100a, 100b, 100c, 100d and also predict e.g. when in time a certain service is needed in order to reduce the downtime of the operation of the door system 100a, 100b, 100c, 100d.

According to some embodiments of the disclosure, the method is carried out by instructions in a software program that is downloaded and run on a portable electronic device 110a, 110b, 110c. In an example the software is a so called app.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in an electronic device for minimizing downtime in operation of a door system, the method comprising:

obtaining a maintenance execution information comprising information identifying service or maintenance that has been carried out on the door system;

obtaining a door system identification information;

obtaining a status pattern associated with the operation of the door system;

associating the obtained status pattern and the maintenance execution information with the door system identification information;

determining if the obtained status pattern is associated with any of at least one reference status pattern, by comparing the obtained status pattern with the at least one reference status pattern;

associating the determined reference status pattern with the door system identification information; and generating a door maintenance information, wherein generating the door maintenance information is based on the door system identification information and the maintenance execution information.

2. The method according to claim 1 wherein generating the door maintenance information is further based on a determined status pattern association.

3. The method according to claim 1 wherein the door system comprising at least a door leaf and/or a door operator.

4. The method according to claim 3 wherein the door operator, for moving at least one door leaf between a closed and an open position comprises a drive unit, a control unit and an supervise unit.

5. The method according to claim 4 wherein the supervise unit comprise one or more sensors configured to provide sensor data associated with the operation of the door operator and/or the at least one door leaf.

6. The method according claim 1 wherein the obtained status pattern comprising sensor data associated with the operation of the door system.

7. The method according to claim 1 wherein the reference status pattern is at least one of a first reference status pattern, a second reference status pattern or a third reference status pattern.

8. The method according to claim 1 wherein the reference status pattern is associated with at least one of:

a service event information;

a no service event information; or a breakdown event information.

9. The method according to claim 1, wherein the door maintenance information comprising at least one of:

a component replacement information;

a service maintenance information;

data software update information;
system adjustment information;
a parameter setting information; and/or
a service time information.

10. The method according claim 1, further comprising:
obtaining a geographic location for at least one door system based on the door system identification information;
detecting door maintenance information for at least one door system within the geographic location; and
determining a time when at least one door system within the certain geographic location needs maintenance based on the door maintenance information for the at least one door system.

11. The method according to claim 1, further comprising:
determining if plural door systems within the certain geographic location needs maintenance within a certain time period based on door maintenance information for the plural door systems.

12. The method according to claim 1, further comprising:
generating a reference status pattern based on at least one previous obtained status pattern.

13. The method according to claim 1, further comprising:
generating a reference status pattern based on at least one previous obtained status pattern and the maintenance execution information.

14. The method according to claim 1, further comprising:
obtaining an updated status pattern associated with the operation of the door system.

15. The method according to claim 1, further comprising:
obtaining an updated status pattern associated with the operation of the door system;
determining if the updated status pattern is associated with the reference status pattern that is a no service event;
associating the maintenance execution information with the obtained status pattern if the updated status pattern is associated with a reference status pattern that is a no service event.

16. An electronic device configured for minimizing downtime in operation of a door system, the electronic device comprising:
a memory;
a processing circuitry, configured to cause the electronic device to:
obtain a maintenance execution information comprising information identifying service or maintenance that has been carried out on the door system;
obtain a status pattern associated with the operation of the door system;
associate the obtained status pattern and the maintenance execution information with a door system identification information;
determine if the obtained status pattern is associated with any of at least one reference status pattern by comparing the obtained status pattern with the at least one reference status pattern;
associate the determined reference status pattern with the door system identification information; and
generate door maintenance information based on the maintenance execution information and the door system identification information.

* * * * *